US012572839B2

(12) United States Patent
Saxena et al.

(10) Patent No.: US 12,572,839 B2
(45) **Date of Patent: \*Mar. 10, 2026**

(54) QUANTUM COMPUTING DEVICE FOR ERROR MITIGATION BY RESTRICTED EVOLUTION AND METHOD THEREOF

(71) Applicant: LG ELECTRONICS INC., Seoul (KR)

(72) Inventors: Gaurav Saxena, Toronto (CA); Thi Ha Kyaw, Burlington (CA)

(73) Assignee: LG ELECTRONICS INC., Seoul (KR)

( \* ) Notice: Subject to any disclaimer, the term of this patent is extended or adjusted under 35 U.S.C. 154(b) by 16 days.

This patent is subject to a terminal disclaimer.

(21) Appl. No.: 18/790,991

(22) Filed: Jul. 31, 2024

(65) Prior Publication Data

US 2025/0278663 A1 Sep. 4, 2025

Related U.S. Application Data

(60) Provisional application No. 63/582,854, filed on Sep. 15, 2023.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS 10,755,193 B2 8/2020 Kandala et al.
2019/0080255 A1\* 3/2019 Allen ..................... G06N 20/00
(Continued)

FOREIGN PATENT DOCUMENTS

WO WO 2021/042028 A1 3/2021

OTHER PUBLICATIONS

Kristan Temme et al., "Error mitigation for short-depth quantum circuits", arXiv:1612.02058v3 [quant-ph] Nov. 6, 2017, 15 pages.
(Continued)

*Primary Examiner* — Mujtaba M Chaudry
(74) *Attorney, Agent, or Firm* — Birch, Stewart, Kolasch & Birch, LLP

(57) ABSTRACT

A method for mitigating error in a quantum computing device can include receiving a quantum circuit configuration including a plurality of quantum gates, and generating a plurality of quasi-probabilistic decompositions for the plurality of quantum gates, respectively, in which each of the plurality of quasi-probabilistic decompositions includes a positive component and a negative component. Also, the method can further include generating an updated quantum circuit configuration by replacing each of the plurality of quantum gates in the quantum circuit configuration with at least one implemental quantum gate selected from among a set of implementable quantum gates, the at least one implemental quantum gate corresponding to the positive component of a corresponding quasi-probabilistic decomposition, and executing the updated quantum circuit configuration, by the quantum computing device, to generate an expectation value.

20 Claims, 7 Drawing Sheets

(56) References Cited

U.S. PATENT DOCUMENTS

| | | | | |
|---|---|---|---|---|
| 2022/0092460 A1* | 3/2022 | Piveteau | ................ | G06N 10/70 |
| 2022/0300849 A1 | 9/2022 | Tannu et al. | | |
| 2022/0358182 A1* | 11/2022 | Nation | ................... | G06F 11/00 |
| 2022/0405626 A1* | 12/2022 | Naveh | ................... | G06N 10/00 |
| 2023/0016119 A1* | 1/2023 | Wei | ....................... | G06N 10/60 |
| 2023/0325556 A1* | 10/2023 | Wei | ........................ | G06F 30/20 |
| | | | | 703/2 |
| 2024/0152795 A1* | 5/2024 | van den Berg | ........ | G06N 10/40 |
| 2024/0169238 A1* | 5/2024 | Layden | ................. | G06N 10/40 |
| 2025/0086487 A1* | 3/2025 | Layden | ................. | G06N 10/40 |

OTHER PUBLICATIONS

Suguru Endo et al., "Practical Quantum Error Mitigation for Near-Future Applications", Physical Review X 8, 031027 (2018), 21 pages.
Zhenyu Cai et al., "Quantum Error Mitigation Review paper", arXiv:2210.00921v3 [quant-ph] Dec. 28, 2023, 43 pages.

* cited by examiner

FIG. 5

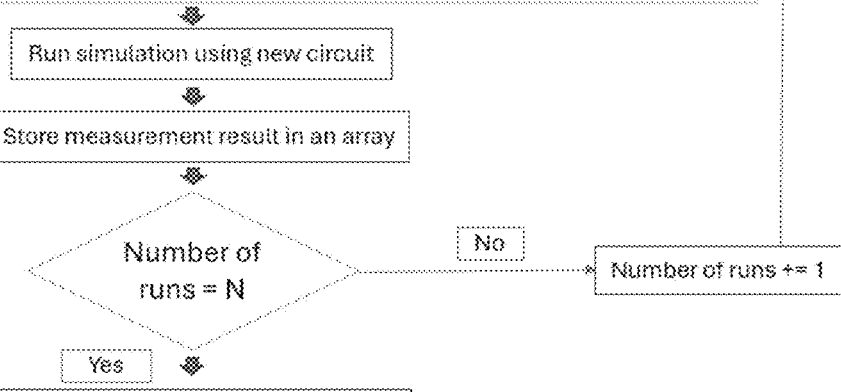

Construct a quantum circuit in terms of single-qubit and two-qubit gates

Get a quasi-probabilistic decomposition of each gate in the circuit such that the terms with positive coefficients are strictly those operations which belong to the set of implementable operations (The terms with negative coefficients can be any quantum operations)

Using the decomposition of each gate, replace the original gate with one of the implementable operations which had positive coefficients according to the probability distribution generated by the positive coefficients Run simulation using new circuit Store measurement result in an array Number of runs = N No Number of runs += 1

Yes $\hat{E}_B \leftarrow$ Output the average of the measurement results stored in array Initial state
preparation Controlled-SWAP (a
multi-qubit operation)

Measurement

QUANTUM COMPUTING DEVICE FOR ERROR MITIGATION BY RESTRICTED EVOLUTION AND METHOD THEREOF

CROSS-REFERENCE TO RELATED APPLICATIONS

This non-provisional application claims priority under 35 U.S.C. § 119(e) to U.S. Provisional Application No. 63/582, 854, filed on Sep. 15, 2023, the entirety of which is hereby expressly incorporated by reference into the present application.

BACKGROUND

Field

The present disclosure relates to a device and method for error mitigation in a quantum computer. Particularly, the method can perform error mitigation by restricted evolution (EMRE), in the field of quantum computing and artificial intelligence (AI).

Discussion of the Related Art

Quantum computers represent a revolutionary leap forward in computing technology with their potential to solve complex problems exponentially faster than classical computers.

Unlike classical computers that use transistors to implement binary bits, which can be either 0 or 1, quantum computers use qubits. Qubits can exist in a superposition of states, allowing them to perform multiple calculations simultaneously and potentially tackle problems that are intractable by classical computers.

For example, quantum computers promise a quantum advantage in numerous applications, such as factoring, solving linear systems, quantum simulations, and quantum chemistry/material discovery.

However, the power of quantum computers comes with unique challenges, such as dealing with noise and decoherence. Quantum systems are inherently fragile and susceptible to various sources of noise and errors. These errors can arise from interactions with the environment, imperfections in hardware components, or limitations in control and measurement mechanisms.

For example, hybrid quantum computers that implement an architecture of a classical computer and a quantum computer working together to solve a problem, also referred to as noisy intermediate scale quantum (NISQ) computers, can execute algorithms that are often designed for short-depth quantum circuits having limited numbers of qubits and gates, e.g., variational quantum algorithms (VQAs) and in the form of a hybrid quantum-classical feedback loop.

However, even NISQ computers having short-depth quantum circuits are not fault tolerant, and the presence of noise and errors can limit their utility. For example, the result output by a quantum computer may be so influenced by noise and errors that its output becomes unreliable or unusable.

In order to extend the reach of near-term quantum computers and NISQ computers, error mitigation techniques are used, such as deploying a mixture of quantum sampling and post-processing techniques.

However, the existing error mitigation techniques require either exponential copies of quantum states or an exponential number of sampling measurements, with respect to the amount of noise present in the quantum hardware. Thus, such techniques become impractical with an increase in the system size and have exponential runtime (e.g., $O(2^n)$).

For example, zero-noise extrapolation (ZNE) and probabilistic error cancellation (PEC) are two types of algorithms that can be used for dealing with errors in quantum computers. While PEC can give an unbiased estimate of the expectation value, is does so at the cost of an exponential sampling overhead (e.g., exponential runtime). On the other hand, ZNE gives a biased estimate by applying the quantum circuit several times and extrapolating the results of each run, in order to get a result which is often inaccurate and is computationally expensive.

Thus, there exists a need for being able to mitigate error in a quantum computer while having reduced sampling overhead and a shorter runtime while still providing an accurate estimate of the expectation value. More particularly, a need exists for determining a reliable estimate of the expectation value with a quantum computer in constant runtime (e.g., $O(1)$).

Further, a need exists for a more elegant error mitigation technique that can reduce processing time and conserve resources while still providing accurate and reliable results.

SUMMARY OF THE DISCLOSURE

The present disclosure has been made in view of the above problems and it is an object of the present disclosure to provide a device and method that can mitigate errors in a quantum computer. Further, the method can perform error mitigation by restricted evolution (EMRE), in the field of quantum computing and artificial intelligence (AI).

An object of the present disclosure is to provide a method for mitigating error in a quantum computing device that includes receiving a quantum circuit configuration including a plurality of quantum gates, generating a plurality of quasi-probabilistic decompositions for the plurality of quantum gates, respectively, and each of the plurality of quasi-probabilistic decompositions including a positive component and a negative component, generating an updated quantum circuit configuration by replacing each of the plurality of quantum gates in the quantum circuit configuration with at least one implemental quantum gate selected from among a set of implementable quantum gates, the at least implemental quantum gate corresponding to the positive component of a corresponding quasi-probabilistic decomposition, and executing the updated quantum circuit configuration, by the quantum computing device, to generate an expectation value.

It is another object of the present disclosure to provide a method that includes repeatedly executing, by the quantum computing device, the updated quantum circuit configuration for a predetermined number of runs to generate a plurality of expectations values, storing the plurality of expectations values corresponding to the predetermined number of runs in a memory of the quantum computing device, and outputting an average expectation value corresponding to an average of the plurality of expectations values.

Another object of the present disclosure is to provide a method, in which the average expectation value is generated according to a constant runtime.

An object of the present disclosure is to provide a method to estimate an expectation value of a Pauli observable O (with respect to some quantum circuit U and some input state) and has a bias b according to Equation: $|E_B - \mathrm{Tr}[O$

3

$\mathcal{U}(|0\rangle\langle0|)]|\leq b$, where $E_B$ is the average expectation value expectation subtracted from an actual ideal value given by a trace operation.

Another object of the present disclosure is to provide a method, in which each of the plurality of quasi-probabilistic decompositions is based on equation $U=sB-(s-1)N$, where U corresponds to a quantum gate in the quantum circuit configuration, B is a probabilistic combination of implementable quantum gates, N is a quantum channel, and s is a coefficient corresponding to a generalized robustness, and the at least one implemental quantum gate selected from among the set of implementable quantum gates and included in the updated quantum circuit configuration includes sB and does not include $-(s-1)N$, in which sB corresponds to the positive component and $-(s-1)N$ corresponds to the negative component.

Yet another object of the present disclosure is to provide a method that includes setting the probabilistic combination of implementable quantum gates (B) to be approximately equal to the quantum gate U by setting the quantum channel N that minimizes s−1.

An object of the present disclosure is to provide a method, in which B is a probabilistic sum of at least two implementable operations including $p_aA+p_bB$, where A is a first implementable gate, B is a second implementable gate, $p_a$ is a first probability, and $p_b$ is a second probability.

Another object of the present disclosure is to provide a method, in which the set of implementable quantum gates includes a Hadamard gate, a T gate, a T-dagger gate, and a controlled-NOT gate.

An object of the present disclosure is to provide a method, in which the plurality of quasi-probabilistic decompositions are determined based on partially depolarizing noise.

Another object of the present disclosure is to provide a method, in which the executing the updated quantum circuit configuration by the quantum computing device has runtime t based on equation: $t=2c^{-2}\log(2p_f^{-1})$, and c is a constant and $p_f$ is a probability of failure.

An object of the present disclosure is to provide a quantum computing device that includes a memory configured to store measured expectation values, and a quantum processor including a plurality of qubits, configured to receive a quantum circuit configuration including a plurality of quantum gates, generate a plurality of quasi-probabilistic decompositions for the plurality of quantum gates, respectively, and each of the plurality of quasi-probabilistic decompositions including a positive component and a negative component, generate an updated quantum circuit configuration by replacing each of the plurality of quantum gates in the quantum circuit configuration with at least one implemental quantum gate selected from among a set of implementable quantum gates, the at least implemental quantum gate corresponding to the positive component of a corresponding quasi-probabilistic decomposition, and execute the updated quantum circuit configuration to generate an expectation value.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

Figure 1:
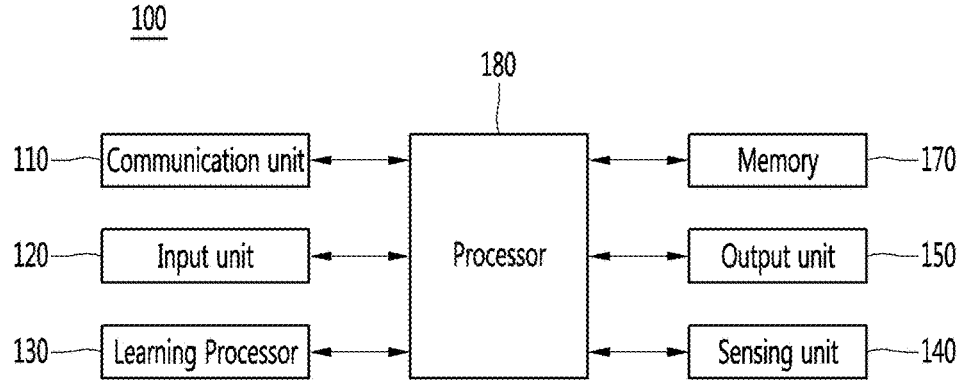

FIG. 1 illustrates an AI device according to an embodiment of the present disclosure.

Figure 2:
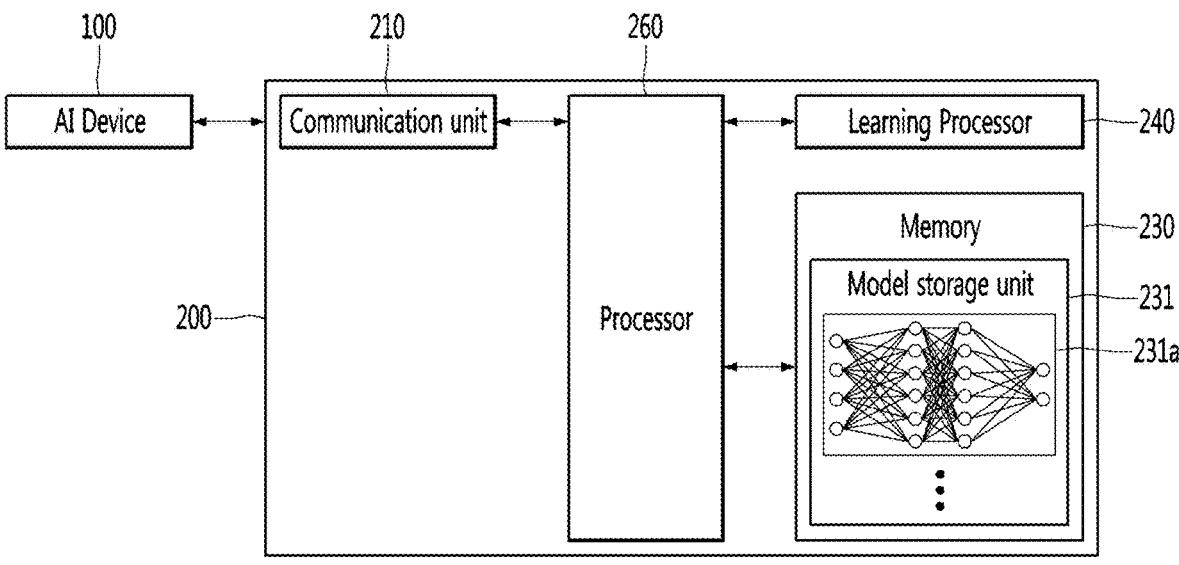

FIG. 2 illustrates an AI server according to an embodiment of the present disclosure.

Figure 3:
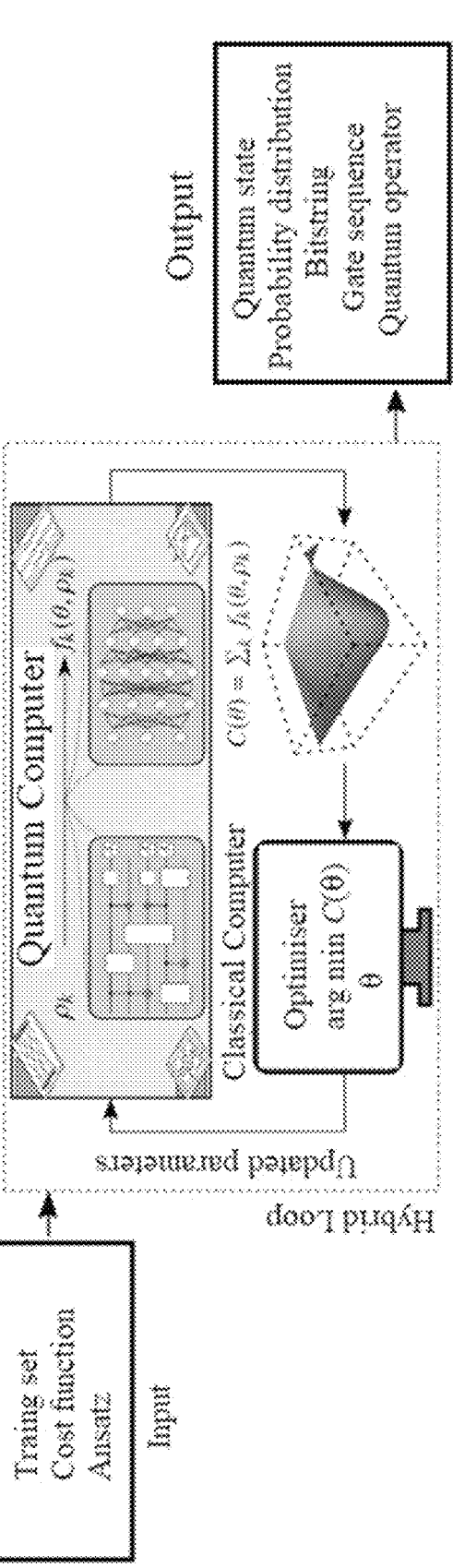

FIG. 3 illustrates a hybrid quantum-classical computer architecture according to an embodiment of the present disclosure.

Figure 4:
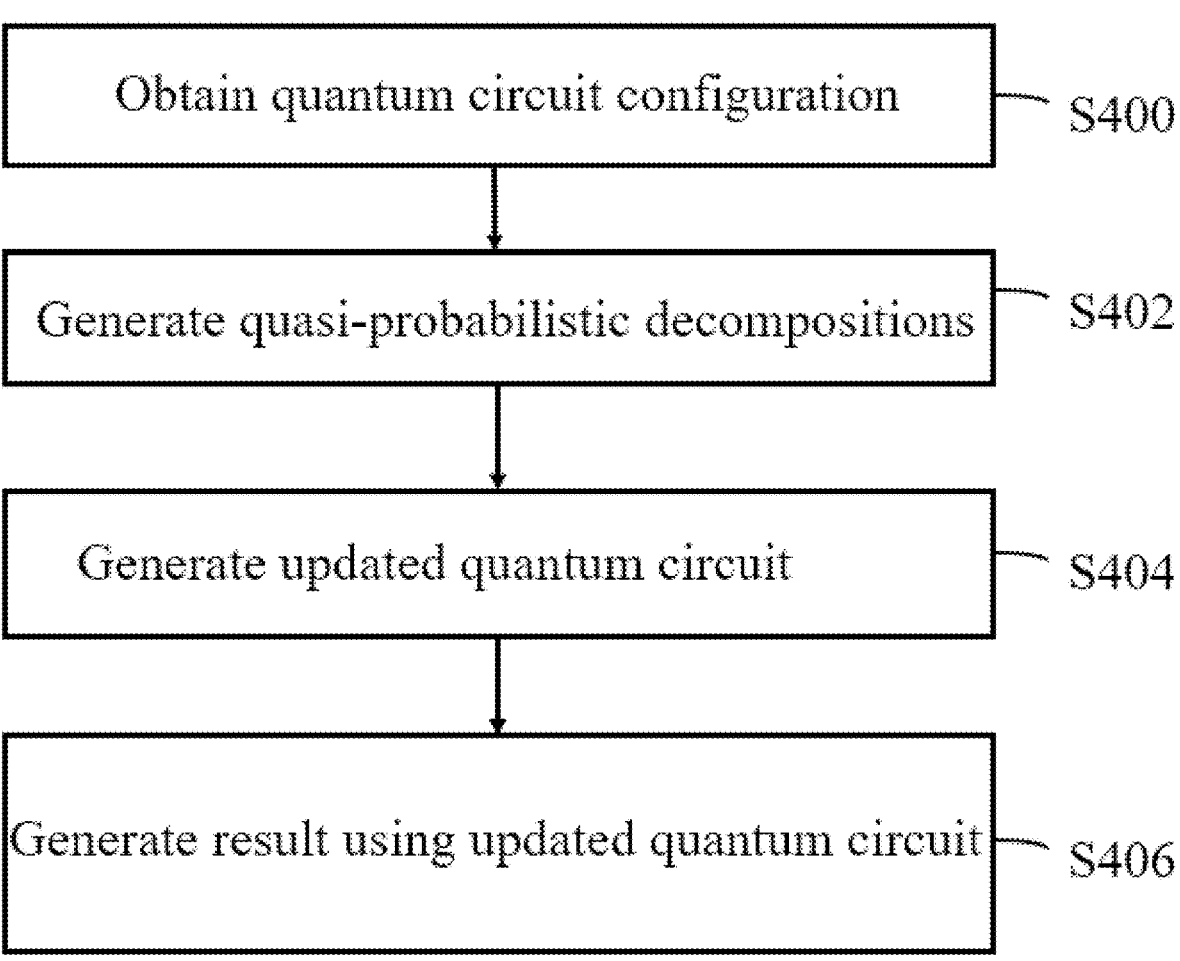

FIG. 4 illustrates an example flow chart for a method of mitigating error in a quantum computing device according to an embodiment of the present disclosure.

FIG. 5 illustrates an example flow chart for a method of mitigating error in a quantum computing device according to an embodiment of the present disclosure.

Figure 6:
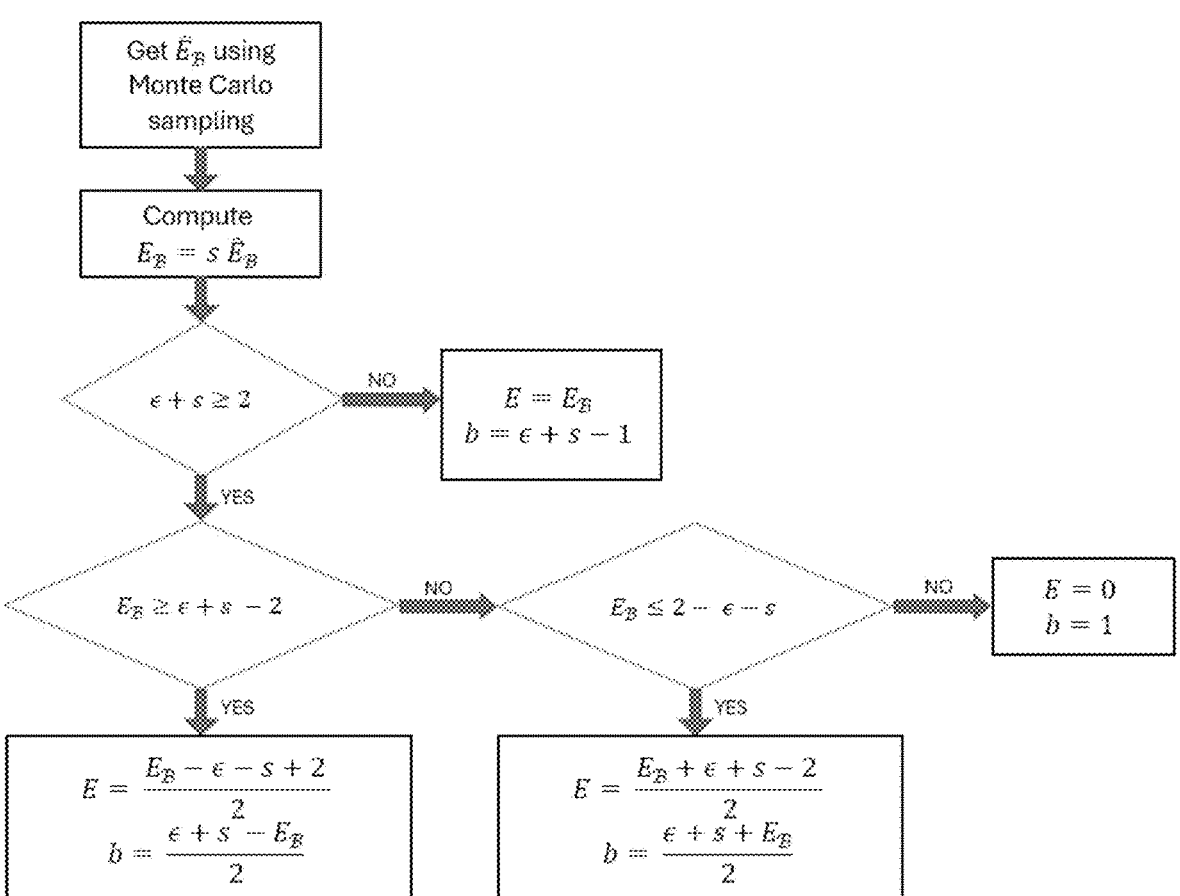

FIG. 6 shows an example flow chart for obtaining a final expectation value estimate E and the bias b, using the estimated $\hat{E}_B$ according to an embodiment of the present disclosure.

Figure 7:
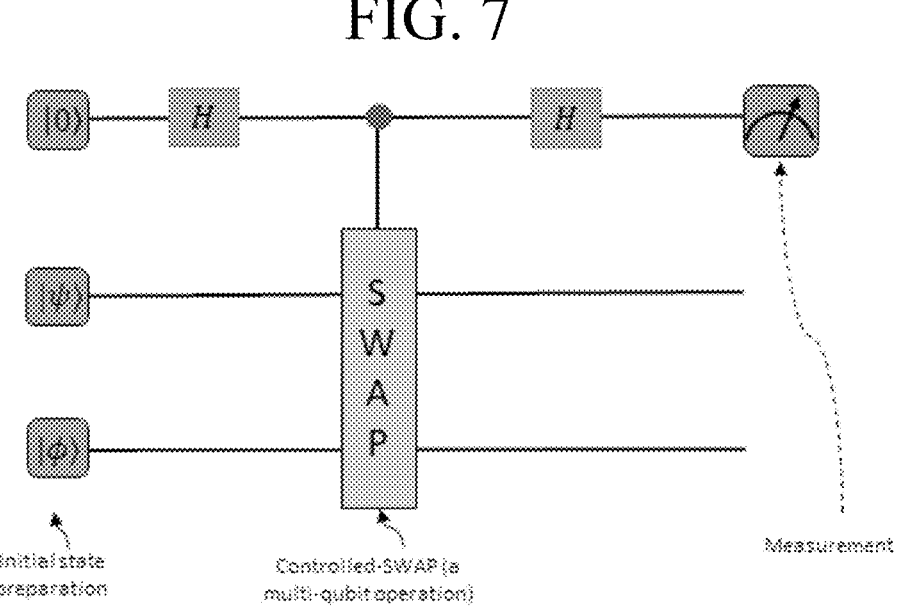

FIG. 7 shows an example of a quantum circuit according to an embodiment of the present disclosure.

Figure 8:
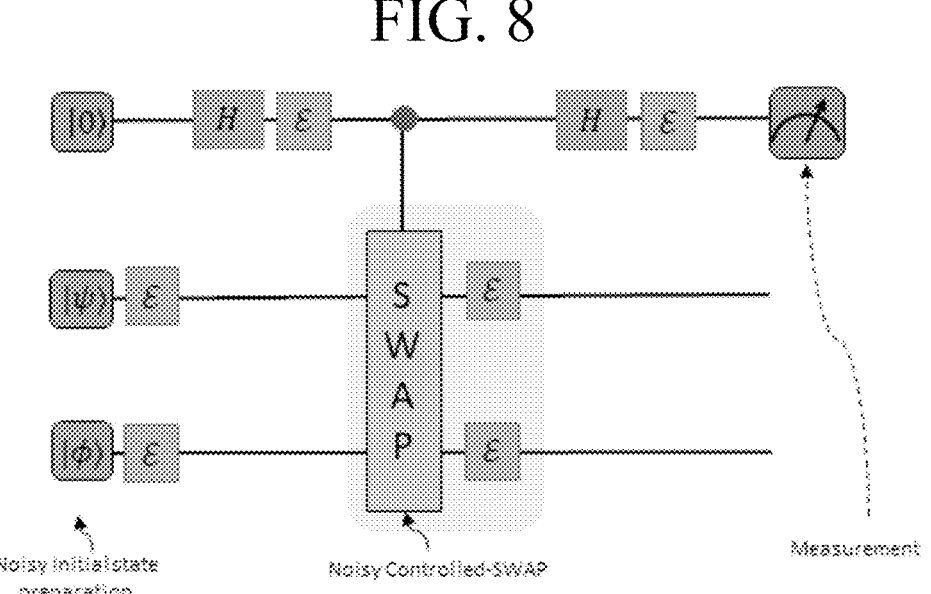

FIG. 8 illustrates an example of a noisy quantum circuit according to an embodiment of the present disclosure.

DETAILED DESCRIPTION OF THE EMBODIMENTS

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through the following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent,"

"next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Also, the term device used herein can refer to a single device or a group of multiple devices that are connected together via wired connections or wireless connections.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Quantum computing is a field of computing that utilizes the principles of quantum mechanics to process and store information. At its core are quantum bits, or qubits, which can exist in multiple states simultaneously due to superposition. Unlike classical bits, which are either 0 or 1, qubits can represent 0, 1, or any combination of both at the same time. This property allows quantum computers to perform many calculations simultaneously, potentially solving complex problems exponentially faster than classical computers.

Also, quantum computing can take advantage of any two state system, e.g., qubits can be based on the spin of an electron, photon polarization, superconducting circuits, nuclear spin, trapped ions, defects in diamond crystals, etc. Quantum computing also involves entanglement, where the states of qubits are interconnected and offer powerful computation capabilities (e.g., computations can scale exponentially by $2^n$ where n is the number of qubits).

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

In addition, a hybrid quantum-classical computer architecture can incorporate a neural network by combining the strengths of both classical and quantum computers to solve complex problems. The quantum component of the architecture can include qubits, which are employed to execute specific quantum computations suited for tasks like quantum simulations, optimization, or solving quantum chemistry problems or material discovery (e.g., a QPU). Also, the classical part of the architecture can include one or more CPU's that can handle tasks that are not well suited for quantum processing, such as managing the overall computation, handling input and output, and running classical algorithms. Further, a neural network can be used to translate data and tasks between the CPU and the QPU, and for optimizing the system, solving for parameters and adjusting parameters (e.g., minimizing a cost function).

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which can be implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an artificial intelligence (AI) device 100 which can be used as part of a hybrid quantum-classical computer architecture (e.g., the classical part), according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100*a* to 100*e* and the AI server 200 (e.g., FIGS. 2 and 3) by using wire/wireless communication technology. For example, the communication unit 110 can transmit and receive sensor information, a user input, a learning model, and a control signal to and from external devices.

The communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data. For example, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using a learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to infer a result value for new input data rather than learning data, and the inferred value can be used as a basis for determination to perform a certain operation.

For example, the learning processor 130 can perform AI processing together with the learning processor 240 of the AI server 200.

In addition, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

In addition, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can evaluate logic rules for solving for or finding parameters that are fed into a quantum circuit (e.g., rotation angles for quantum gates, etc.).

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine an answer or a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can control at least part of the components of AI device 100 to drive an application program stored in memory 170. Furthermore, the processor 180 can operate two or more of the components included in the AI device 100 in combination to drive the application program.

FIG. 2 illustrates an AI server 200 according to one embodiment. The AI sever can implement one or more components or tasks related to the classical computing portion in the hybrid quantum-classical computer architecture.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. Also, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231*a*) through the learning processor 240.

The learning processor 240 can learn the artificial neural network 231*a* by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in the memory 230.

The processor 260 can infer the result value for new input data by using the learning model and can generate a response or a control command based on the inferred result value.

FIG. 3 illustrates a hybrid quantum-classical computer architecture according to an embodiment of the present disclosure.

The hybrid quantum-classical computer architecture can include a Quantum Processing Unit (QPU) and a Classical Processing Unit (CPU) interfaced to leverage the advantages of quantum and classical computing. The QPU includes qubits capable of superposition and entanglement for executing quantum algorithms and operations to tackle complex problems with exponential speed-ups. For example, the qubits can represent multiple states simultaneously due to superposition, enabling various quantum algorithms and quantum simulations.

In addition, the CPU can manage classical computations, data input/output, and overall system control. An interface layer can be included which facilitates communication between the quantum and classical components, such as translating high-level tasks into quantum operations and vice versa. This layer includes software, firmware, and protocols for carrying out tasks, optimizing performance, and managing the hybrid system.

Quantum algorithms are run on the QPU to exploit quantum properties such as superposition and entanglement. These algorithms, such as variational quantum algorithms (VQA) and quantum chemistry simulations, can outperform classical counterparts in specific tasks. Also, control software operating on the CPU can oversee the hybrid system's operation, including error correction, noise mitigation, and optimization routines used for quantum computation.

In addition, error correction and mitigation techniques can be integrated into the architecture to address inherent noise and error rates in the quantum hardware. The hybrid architecture can also include an application layer for user interface software and algorithms, enabling interaction with the system for inputting problems, receiving results, and analyzing data.

In more detail, the classical computer can include an optimizer or optimization function, which can implement a cost function or objection function. The cost function can be optimized using various techniques, such as gradient descent, but embodiments are not limited thereto. Also, the optimizer can use various hyperparameters, such as determining how many iterations to use and how big the steps should be for use in a descent for converging on a minimum.

The hybrid quantum-classical computer architecture can be referred to as a near-term quantum computer, a noisy intermediate scale quantum (NISQ) computer or a NISQ device.

FIG. 7 shows an example of a quantum circuit that can be implemented by the QPU. The quantum circuit can include multiple qubits. The quantum circuit in FIG. 7 is an example of a short-dept quantum circuit (e.g., a SWAP circuit, to be discussed in more detail below). For example, NISQ algorithms can be designed for short-depth quantum circuits with limited numbers of qubits and gates, e.g., variational quantum algorithms (VQAs).

Also, optimization problems often arise in physics, mathematics, and computer science. The problem of finding the ground state pertaining to a Hamiltonian is one such problem which can be cast as an optimization problem. Variational quantum algorithms (VQAs) can be utilized to address this problem. VQAs can use noisy quantum computers and classical optimization to solve such optimization problems and can gain near term quantum advantage. For example, VQAs can be used in various applications such as efficiently finding the ground state of a Hamiltonian, diffusion quantum Monte Carlo, etc.

Also, various operations can be applied to the qubits in the quantum computer. For example, the operations can include rotations around certain axes, e.g., RY gates for qubit rotations, etc.

Further, measurements can be performed on the qubits. These measurements can provide information about the current state's proximity to the ground state. For example, the measured information can be used to determine how well the system is evolving towards the desired state.

In addition, based on the measurements and a given cost function, the classical computer can solve for various parameters and apply the updates to the quantum gates. In other words, the guess for finding the ground state (e.g., lowest energy state) or other parameter can be effectively refined. This can be repeated as a type of optimization loop and the system can gradually converge to the ground state.

According to embodiments, the classical computer can use an artificial intelligence (AI) model (e.g., a neural network) to solve for parameters of the quantum circuit, but embodiments are not limited thereto.

Also, it can determine whether the system converges to a desired state (e.g., the ground state). If convergence is not reached, then the process repeats and the quantum computer is updated with the new set of parameters (e.g., thetas in FIG. 3) and the quantum circuit can be run again. The process can iterate until convergence is reached and the output is a final result.

For example, a final result can be the calculated ground state of the quantum system, which can be useful for a wide range of simulations across various fields, such as quantum chemistry, material science, physics, cryptography etc. For instance, calculating the ground state molecules provides insights into their electronic structures, bond energies, and reaction mechanisms, can be used for drug discovery, and developing new materials.

However, the final result may not be reliable due to noise that may be present in the system. To address errors due to noise, various techniques can be applied, which can be very time consuming, resource intensive and biased.

For example, removing or mitigating noise is a considerable challenge in quantum computation and communication. Quantum error correction schemes can be applied to detect and correct noise that affect quantum computation. These schemes often require some kind of encoding and decoding that can protect from noise ruining the quantum computation. However, these schemes can require thousands to millions of qubits, in order for the quantum algorithms to be able to deliver any meaningful results.

Various types of quantum error mitigation (QEM) can be applied to improve the measurement outcome of the expectation value of some physical observable, such as zero-noise extrapolation (ZNE), probabilistic error cancellation (PEC) and Clifford-data regression.

In order to compare different error mitigation protocols, three parameters (to measure the performance of the protocols) can be examined that include the number of ancilla qubits used, the amount of bias present in the generated estimate, and the sampling overhead. Sampling overhead is often related to the variance. The bias and variance are defined in Equation 1 and Equation 2, below.

$$\text{Bias} = E[\hat{O}] - Tr[O\rho] \qquad \text{[Equation 1]}$$

$$\text{Var} = E[\hat{O}^2] - E[\hat{O}]^2 \qquad \text{[Equation 2]}$$

For example, the bias-variance tradeoff involves finding a balance between an algorithm's accuracy and its ability to handle variations in data or noise. High-bias algorithms can be easier to implement but may miss crucial details, while high-variance algorithms can be rather complex but prone to inconsistencies. It is desirable to find a middle ground for an algorithm that is less computationally intensive but can still provide accurate results with an acceptable amount of bias.

Zero-noise extrapolation (ZNE) operates by systematically amplifying the noise present in a quantum computer in a controlled manner and then extrapolating the results back to the zero-noise limit (e.g., plotting a line with increased noise, and then traversing it backwards).

For example, ZNE includes running the same quantum circuit many times with different noise amplification factors, measuring the outcomes, and then fitting a curve to the data that relates the noise level to the measured quantities. By extrapolating this curve to the point where the noise is zero, the ideal outcome that would be obtained in the absence of noise can be estimated, thus mitigating the errors caused by the noisy quantum hardware.

However, while ZNE can be effective in mitigating some errors, it requires significant computational overhead due to the need to run the same quantum circuit multiple times with varying noise levels, which can make it impractical for large-scale or complex quantum circuits. Further, ZNE relies upon accurate noise models and extrapolation techniques, which may not always be readily available or applicable to specific hardware platforms. Also, the amplification of noise in ZNE can sometimes introduce new errors or exacerbate existing ones, potentially hindering the accuracy of the mitigated results, and ZNE does not address all types of errors, which may lead to biased and unreliable results.

On the other hand, probabilistic error cancellation (PEC) can produce unbiased results, but this comes at the cost of increased sampling overhead and exponential runtime. Probabilistic Error Cancellation (PEC) leverages knowledge of the noise affecting a quantum system to reduce errors in computation.

PEC can include characterizing the noise present in a quantum circuit, constructing a mathematical model, and then using this model to generate a quasi-probability distribution that describes the likelihood of different error configurations.

For example, PEC can include studying the specific types of errors that occur in the quantum computer's hardware and creating a mathematical model to predict how these errors will affect the calculations. Based on this model, PEC can add controlled "noise" to the quantum circuit (e.g., applying an inverse noise map or inverse noise matrix before or after each quantum gate). This added noise can cancel out the existing errors, similar to how noise-canceling headphones work (e.g., even though PEC and noise-canceling headphones operate on fundamentally different principles). By running the quantum circuit multiple times with different added noise patterns and averaging the results, the errors tend to cancel each other out, producing a more accurate answer.

In PEC, each unitary gate in the quantum circuit is decomposed as a quasi-probabilistic combination of the erroneous unitary gates (or a discrete set of implementable gates). Finding such a decomposition in itself can be a rather difficult problem and finding an optimal decomposition is even harder.

Further, assuming that such a decomposition can be found, then each quantum gate in the quantum circuit can be replaced with each implementable gate, and the quantum circuit can be run. By using the Monte Carlo simulation, an unbiased estimate can then be found. However, the runtime depends on a quantity called robustness which is the sum of the absolute values of the coefficients in the quasi-probabilistic decomposition.

For example, PEC requires exponential sampling overhead and exponential runtime, which can quickly become unmanageable or destroy any quantum advantage as the size of the quantum circuit becomes larger.

According to one or more embodiments of the present disclosure, the quantum computing device can apply PEC to one or more quantum gates within a quantum circuit.

In more detail, PEC can include five main steps that include characterizing the noise in a quantum circuit, creating a noise model, generating a quasi-probabilistic distribution of one or more quantum gates (e.g., including positive probability components and negative probability components), probabilistic sampling, and averaging the results.

For example, according to an embodiment, the quantum computing device can receive a quantum circuit representing a given computation to perform, and obtain a noise characterization of the quantum circuit that includes information about the types and probabilities of errors that occur during quantum gate operations. The noise characterization can be based on statistical tools and can include gate error rates, coherence times, and crosstalk data.

Further, based on the noise characterization, the quantum computing device can select or receive a noise model, or the quantum computing device can generate the noise model. The noise model can be based one or more of depolarizing noise, amplitude damping, stochastic Pauli noise, phase damping, bit-flip noise, etc. The noise model can be a mathematical model representing how the noise in the quantum circuit effects quantum states.

In addition, the quantum computing device can generate a quasi-probabilistic distribution of each quantum gate within the quantum circuit based on the selected noise model. In addition to positive probability distributions, the quasi-probabilistic distribution of a quantum gate can include negative values or complex values. The quasi-probabilistic distribution can be obtained based on the Choi matrix (e.g., Choi-Jamiołkowski isomorphism) or tomography (e.g., a density matrix based on measurements or a generalization that reconstructs the quantum channel).

Further, the quantum computing device can generate an updated quantum circuit in which each quantum gate is replaced by its corresponding quasi-probabilistic distribution (e.g., including positive and negative components). Linear algebra can be used so that the noise can be represented as a matrix that acts on the quantum state.

In addition, the quantum computing device can run the updated quantum circuit multiple times with different random variations to provide many results. According to an embodiment, Monte Carlo sampling can be used.

Then, the results of the different runs can be averaged to generate an average result corresponding to the estimated expectation value. For example, the matrices representing the noise can approximate the inverse of the noise matrix when averaged and the noise can be effectively canceled out.

FIG. 4 shows an example flow chart of a method for mitigating error in a quantum computing device according to an embodiment of the present disclosure. For example, the quantum computing device can be configured with a method that includes receiving a quantum circuit configuration including a plurality of quantum gates (e.g., S400), and generating a plurality of quasi-probabilistic decompositions for the plurality of quantum gates, respectively, and each of the plurality of quasi-probabilistic decompositions including a positive component and a negative component (e.g., S402).

Also, the method can further include generating an updated quantum circuit configuration by replacing each of the plurality of quantum gates in the quantum circuit configuration with at least one implemental quantum gate selected from among a set of implementable quantum gates, in which the at least implemental quantum gate corresponds to the positive component of a corresponding quasi-probabilistic decomposition (e.g., S404), and executing the updated quantum circuit configuration, by the quantum computing device, to generate an expectation value (e.g., S406). Various aspects of the method are discussed in more detail below, according to embodiments.

FIG. 5 shows an example flow chart of a method of controlling a quantum computing device according to an embodiment of the present disclosure.

According to an embodiment, a quantum computing device can perform error mitigation by restricted evolution (EMRE), which can include decomposing the unitary gate as a probabilistic combination of the implementable gates and some quantum channel, as shown in Equation 3 below.

$$\mathcal{U} = (1 + s)\mathcal{B} - s\mathcal{N} \qquad \text{[Equation 3]}$$

In Equation 3, U is the actual quantum gate, B is a probabilistic combination of the implementable erroneous gates, and N is some quantum channel. Also, s is a coefficient, which can be used to define a measure called generalized robustness and can be used to calculate the runtime of the algorithm. The generalized robustness and runtime are discussed in more detail at a later section below. Further, the variable s needs to be greater than or equal to 0.

In addition, each quantum gate within a quantum circuit can be decomposed into a positive component (e.g., (1+s)B) and a negative component (e.g., −sN).

According to an embodiment, the negative component (e.g., −sN) can be ignored, and the original quantum gate can be approximated as B multiplied by (1+s) (e.g., an optimal decomposition can have the negative component be a very small number).

In other words, in order to drastically reduce runtime and computations, the negative component (e.g., −sN) can be ignored or discarded, and each quantum gate within a quantum circuit can be replaced by its corresponding positive component (e.g., (1+s)B), which can be represented as some convex combinations of noisy implementable gates.

In addition, the variable s in Equation 3 can be reorganized such that instead of s, new s−1 needs to be greater than 0, to produce an equivalent equation, as shown below in Equation 4.

$$\mathcal{U} = s\mathcal{B} - (s - 1)\mathcal{N} \qquad \text{[Equation 4]}$$

In the above equations, B corresponds to a convex combination of noisy implementable gates and can be defined by Equation 5 below.

$$\mathcal{B} = \sum_i p_i O_i \qquad \text{[Equation 5]}$$

In Equation 5, $\mathcal{B} \in \mathcal{I}_\varepsilon(d)$ and $\mathcal{N} \in \text{CPTP}(d)$, in which the sets $I_\varepsilon(d)$ and CPTP(d) denote the set of implementable operations (e.g., basis of noisy operations) and completely positive and trace preserving operations, respectively, with input and output systems being d-dimensional. CPTP(d) can represent the set of all possible quantum channels.

In addition, the implementable operation(s) B can bet set as close to the actual quantum gate U as possible by setting a quantum channel N that minimizes s−1.

For example, this optimal s−1 can be referred to as generalized robustness or global robustness and can be denoted as $R_{\mathcal{I}_\varepsilon}^+(\mathcal{U})$. Further, the generalized robustness or global robustness $R_{\mathcal{I}_\varepsilon}^+(\mathcal{U})$ (e.g., optimal s−1) can be represented as an optimization problem (e.g., a minimization), as shown in Equation 6 below.

$$R_{\mathcal{I}_\varepsilon}^+(\mathcal{U}) = \min s - 1 \text{ s.t.} \frac{\mathcal{U} + (s - 1)\mathcal{N}}{s} \in \mathcal{I}_\varepsilon(d), \qquad \text{[Equation 6]}$$
$$s - 1 \geq 0, \mathcal{N} \in CPTP(d)$$

In addition, the dual of the primal problem in Equation 6 can be represented an as a type of maximization optimization problem, as shown in Equation 7 below.

$$R_{\mathcal{I}_\varepsilon}^+(\mathcal{U}) = \sup \text{ } Tr[J^{\mathcal{U}}\mathcal{B}] - 1 \text{ s.t.: } 0 \leq Tr[J^Y\mathcal{B}] \leq 1, \qquad \text{[Equation 7]}$$
$$\mathcal{B}_A \geq 0, Y \in \mathcal{I}_\varepsilon(d)$$

In the above optimization, $J^U(J^Y)$ denote the Choi matrix of U(Y) defined as $J^{\mathcal{U}} := \text{id} \otimes \mathcal{U}(\Phi_d^+)$, and $\Phi_d^+ := \Sigma_{i,j}|i\rangle\langle j|\otimes|i\rangle\langle j|$ is the d-dimensional unnormalized maximally entangled state. For example, J represents the Choi-Jamiolkowski map of the respective quantum channels.

For example, the d-dimensional unnormalized maximally entangled state $\Phi_d^+$ can describe two quantum systems (e.g., each with d possible states) that are as intertwined as quantum mechanics allows or has the highest possible degree of entanglement between the two systems, in which $\otimes$ is the tensor product for combining the basis states of the individual quantum systems. For example, measuring one system can instantly reveal the state of the other, regardless of the distance between them.

According to embodiments, in the minimization optimization problem of Equation 6 and in the maximization optimization problem of Equation 7, the value of s can be solved for by using known libraries, e.g., software frameworks and tools designed for expressing and solving optimization problems on quantum hardware (e.g., Qiskit optimization, OpenQAOA, D-Wave Ocean, etc.). Thus, having solved for s and B, the original quantum gate can be approximated as B multiplied by s.

In addition, using the formulations of the generalized robustness, good upper and lower bounds can be found given a particular (but not necessarily optimal) decomposition of U based on Equation 8 below.

$$s \geq R^+(\mathcal{U}) \geq \frac{1}{d^2 s} Tr\left[\Phi_d^+ J^{\varepsilon'}\right] \qquad \text{[Equation 8]}$$

For example, d is the dimension of the system on which U acts, and in the lower bound expression $\Phi^+$ represents the unnormalized maximally entangle state, and $\varepsilon' = s\mathcal{B} \circ \mathcal{U}^\dagger$.

In more detail, the quantum computing device can perform a method of error mitigation by restricted evolution (EMRE) by decomposing each quantum gate within the quantum circuit, in which each quantum gate is approximated and replaced with a corresponding convex combination of noisy implementable gates to generate an updated quantum circuit configuration, which is a close approximation of the original quantum circuit.

For example, a decomposition can be generated for each quantum gate, which can be restricted to only its positive components (e.g., the negative components from the decomposition can be ignored or unused when generating the updated quantum circuit configuration).

For example, an n-qubit quantum circuit with depth N can be represented by Equation 9 below.

$$\mathcal{U} := \mathcal{U}_N \circ \ldots \circ \mathcal{U}_2 \circ \mathcal{U}_1 \qquad \text{[Equation 9]}$$

As shown above, the n-qubit quantum circuit can be defined as quantum gate $U_1$, acting on quantum gate $U_2, \ldots$, acting on quantum gate $U_N$. For example, each $U_i$ represents the i-th layer of the quantum circuit acting on n qubits. Also, for each layer i, a number $s_i \geq 1$ and an implementable channel $B_i$ can be found according to Equation 10 below.

$$s_i \mathcal{B}_i \geq \mathcal{U}_i \qquad \text{[Equation 10]}$$

According to the above, there exists a set of quantum channels $\{N_i\}_i$ such that for each respective quantum gate $U_i$, Equation 11 holds.

$$\mathcal{U}_i = s_i \mathcal{B}_i - (s_i - 1)\mathcal{N}_i \qquad \text{[Equation 11]}$$

For example, this can be referred to as the generalized quasi-probability decomposition. By using the above decomposition for all quantum gates in the quantum circuit, the quantum circuit can be represented based on Equations 12, 13 and 14 below.

$$\mathcal{U} = s\mathcal{B} - (s - 1)\mathcal{N}, \qquad \text{[Equation 12]}$$

where $$s = \prod_{i=1}^{N} s_i, \text{ and} \qquad \text{[Equation 13]}$$

$$\mathcal{B} = \mathcal{B}_N \circ \ldots \circ \mathcal{B}_2 \circ \mathcal{B}_1 \qquad \text{[Equation 14]}$$

As shown above, N is the quantum channel that includes all other combinations, and s is all of the individual coefficients $s_i$ of the quantum gates multiplied together.

According to an embodiment, in order to reduce the sampling overhead and shorten the runtime, each quantum gate or unitary $U_i$ can be approximated as the corresponding positive component $s_i B$. In other words, each unitary gate at the i-th layer can be replaced with $B_i$ and multiply the estimate after the measurement with $s_i$. Accordingly, the quantum circuit can be approximated with noisy implementable operations as in Equation 15 below.

$$\mathcal{U} \approx s\mathcal{B} = s\mathcal{B}_N \circ \ldots \circ \mathcal{B}_2 \circ \mathcal{B}_1 \qquad \text{[Equation 15]}$$

In addition, using the approximation in Equation 15, the quantum computing device can estimate the expectation value (e.g., $E_B$) of a Pauli observable O and a bias b according to Equation 16 below.

$$|E_\mathcal{B} - Tr[O\mathcal{U}(|0\rangle\langle 0|)]| \leq b \qquad \text{[Equation 16]}$$

In other words, the estimated expectation value $E_B$ output by the quantum computing device can be subtracted from the actual ideal value given by the trace operation to get the bias b, in which the bias b is equal to the maximum amount of bias in the system.

Further, the bias b arises from the terms that were ignored or unused (e.g., the negative components based on N) when approximating each quantum gate in the quantum circuit to create the implementable quantum circuit (e.g., a noisy circuit).

In addition, according to an embodiment, the quantum computing device can estimate the expectation value $E_B$ from the implementable quantum circuit using Monte Carlo sampling, and the estimated expectation value $E_B$ can satisfy Equation 17 below.

$$|E_\mathcal{B} - sTr[O\mathcal{B}(|o\rangle\langle 0|)]| \leq \epsilon \qquad \text{[Equation 17]}$$

In Equation 17, $\varepsilon$ can be a very small number defined as cs, in which c≪1.

In addition, as shown by the flowchart in FIG. 6, the estimated expectation value $E_B$ and the bias b can be found when $E_B \leq 2-\varepsilon-s$. In this situation, the estimate can be $(E_B+\varepsilon+s-2)/2$ and the bias can be $(\varepsilon+s+E_B)/2$ which depends on $E_B$.

Further, when the condition $2 \leq \varepsilon+s$ is violated, e.g., as in Equation 18 below, then $\varepsilon+s-2 \leq E_B \leq 2-\varepsilon-s$, and the estimated expectation value can be equal to $E_B$ and the bias b can be a constant that is defined by Equation 19 below.

$$\epsilon + s < 2 \qquad \text{[Equation 18]}$$

$$b = \epsilon + s - 1 \qquad \text{[Equation 19]}$$

In addition, in order to find expectation value $E_B$, Montel Carlo sampling can be used, which can reduce the sampling overhead. For example, as shown in FIG. 6, the final expectation value and bias for the EMRE method can be obtained according to various inequality conditions being satisfied.

For example, the approximated quantum circuit (e.g., using only positive components to approximate each quantum gate) can be run multiple times and each measurement outcome can be a sample from a probability distribution. Further, the expectation value of an observable can be estimated by averaging the results of the measurements over many samples.

In addition, the sampling overhead of the quantum computing device performing error mitigation by restricted evolution (EMRE) can be determined based on the Hoeffding's inequality according to Equation 20 below, in which $(1-p_{fail})$ is the success probability, where $p_{fail}$ is fixed.

$$M = \frac{2s^2}{\epsilon^2} \ln\left(\frac{2}{p_{fail}}\right) = \frac{2}{c^2} \ln\left(\frac{2}{p_{fail}}\right) \qquad \text{[Equation 20]}$$

For example, the quantum computing device can implement the EMRE algorithm whereby approximating the original unitary gate U with the probabilistic combination of implementable operations, and subsequently performing the Monte-Carlo sampling, a biased estimate of the expectation value can be generated, in which the runtime t can be given by the maximum integer equal to or close to Equation 21 below.

$$t = 2c^{-2} \log(2p_f^{-1}) \qquad \text{[Equation 21]}$$

In Equation 21, c is a constant and $p_f$ is the probability of failure.

In addition, the bias can be the maximum error or deviation from the actual result given by Equation 22 below.

$$\Delta = (1 + c)R^+(U) \qquad \text{[Equation 22]}$$

In Equation 22, c is the same constant in Equation 21, and $R^+(U)$ is the generalized robustness of the unitary channel.

In other words, the quantum computing device performing error mitigation by restricted evolution (EMRE) can have constant runtime (e.g., in contrast to exponential runtime) which is much faster and can substantially reduce the sampling overhead, while also producing an estimate of the expectation value that has a low bias or an acceptable amount of bias.

FIG. 5 shows an example flow chart for a method for performing error mitigation by restricted evolution (EMRE), according to an embodiment of the present disclosure.

For example, the process can include constructing a quantum circuit that includes single-qubit gates and two-qubit gates by a quantum computing device or receiving the quantum circuit configuration by the quantum computing device.

Then the process can proceed by the quantum computing device generating a quasi-probabilistic decomposition for each quantum gate within the quantum circuit, in which the quasi-probabilistic decomposition includes positive coefficients and negative coefficients (e.g., see Equations 3 and 4, above). For example, the positive coefficients of the decomposition are only operations that belong to a set of implementable operations (e.g., noisy implementable quantum gates), and the negative coefficients can be any quantum operations (e.g., some quantum channel N).

In more detail, for a general error e, it is a difficult problem to find the most optimal decomposition of U such that U=sB−(s−1)N, where B denotes the probabilistic sum of implementable operations (e.g., probabilistic sum of $p_a A + p_b B$, such as 40% ($p_a$) of the time it operates as implementable gate A and 60% ($p_b$) of the time it operates as implementable gate B), and N can be any quantum operation (e.g., even unimplementable operations). As discussed above with regards to Equation 5, $B=\Sigma p_i O_i$, where the $O_i$'s belong to the set of implementable operations and the $p_i$'s are probabilities.

In addition, to find the decomposition, the optimization problem of Equation 6 can be solved which outputs the coefficient s and the quantum operation N. Further, using the coefficient s and the quantum operation N, then the probabilistic sum of implementable operations B can be generated. Also, since the implementable operations $O_i$'s are known, then the probabilities can be found using linear algebra.

Further, the quantum computing device can use the quasi-probabilistic decomposition of each quantum gate within the quantum circuit, and replace the original quantum gate with one of the implementable operations which had positive coefficients according to the probability distribution generated by the positive coefficients. For example, the quantum computing device can generate an approximated quantum gate corresponding to the original quantum gate, which can be approximated as B multiplied by s (e.g., see Equation 15).

In addition, the quantum computing device can generate a new quantum circuit in which the original quantum gates have been replaced with their corresponding approximated gates (e.g., having only positive components), in which the negative components from the quasi-probabilistic decomposition are not used and are ignored. In other words, all of the original quantum gates in the quantum circuit can be replaced with approximated gates made up of noisy implementable operations having only positive probability components.

However, according to another embodiment, the new quantum circuit can include one or more quantum gates represented by their corresponding quasi-probabilistic decomposition and one or more quantum gates represented by implementable operations having only positive probability components, in which way the bias can be reduced but this can increase the sampling overhead which can lead to a non-constant runtime. However, even if the new quantum circuit is run according to a non-constant runtime, this can be manageable by keeping the number of gates represented by a quasi-probabilistic decomposition to a minimum.

Then, the quantum computing device can run the new circuit for a plurality of times (e.g., for N runs) and store the results in an array, which can be stored in a memory of the quantum computing device. The number of runs N can be input by a user or set as a default number, but embodiments are not limited thereto.

According to an embodiment, the quantum computing device can be a quantum computer, a hybrid quantum computer that implements an architecture of a classical computer and a quantum computer, or a classical computer simulating a quantum computer.

In addition, the quantum computing device can use Monte Carlo sampling for sampling results of the plurality of runs of the new quantum circuit (e.g., including the approximated gates). Upon completing the number of N runs, the quantum computing device can generate an average value of the measurement results stored in the array. The average value of the measurement can be output, such as being displayed on a display and stored in the memory. Also, the average value of the measurement can be transmitted by the quantum computing device to an external device. The average value can be the expectation value of a physical observable.

In this way, a reliable estimate of the expectation value can be generated in much less time, with drastically reduced sampling overhead, while having an acceptable amount of bias. Also, the quantum computing device implementing the EMRE method can produce an accurate and reliable estimate of the expectation value in constant runtime (e.g., with about 1,000 to 1,100 samples if the precision of the Monte Carlo simulation is set to 97%).

With reference to FIGS. 7 and 8, an example quantum circuit simulation is shown which can be used by the quantum computing device implementing the EMRE method.

FIG. 7. Shows an example quantum circuit for implementing the SWAP test which can be used to test how much two quantum states differ from each other. For example, the SWAP test is an algorithm that can determine the similarity or overlap between two quantum states.

An auxiliary qubit (ancilla) can be used to control a SWAP gate, which exchanges the states of the two qubits being compared. After applying Hadamard gates to the ancilla qubit before and after the controlled-SWAP gate, a measurement of the ancilla qubit reveals information about the overlap between the two states. The probability of measuring the ancilla in the state $|0\rangle$ is directly related to the squared magnitude of the inner product between the two states, thus quantifying their similarity.

In more detail, the circuit shown in FIG. 7 can be used to check how much the states $|\psi\rangle$ and $|\varphi\rangle$ differ from each other. The controlled-SWAP operation is a multiple-qubit operation. If the states $|\psi\rangle$ and $|\varphi\rangle$ are 3-qubit states each, the in actual experimental implementation, the C-SWAP gate is implemented using about 130 single and two-qubit gates, which are the Hadamard gate, T gate, T-dagger gate, and the controlled-NOT gate. For example, these gates (H, T, T-dagger, CNOT) form the basis of the implementable gates.

In addition, upon measurement, the output is a probability of getting 0 and 1, which can be referred to as probability $p_0$ and probability $p_1$, respectively. Then, using these probabilities, it can be quantified how much both states differ from each other.

Further in this example, using the probability $p_0$ and the probability $p_1$, the expectation value of the Z observable can be computed by subtracting the probability $p_1$ from the probability $p_0$ (e.g., $p_0-p_1$).

However, since quantum hardware is noisy, experimental implementation of this circuit will involve noisy gates. As shown in FIG. 8, to simulate the effect of noise on the measurement result, the noise is assumed to act after every gate in the circuit (e.g., $\varepsilon$).

For example, for the specific situation of partially depolarizing noise, an ideal gate G in the circuit can be decomposed as $G(.)=[4/(4-3p)]DG(.)-[p/(4-3p)](XG(.)+YG(.)+ZG(.))$, and the approximation for the ideal G is the erroneous G itself (multiplied by a factor).

According to an embodiment, the quantum computing device can implement an error mitigation by restricted evolution (EMRE) method that includes a process of repeating the following actions for a fixed number of steps N, in which at each step, the quantum gate is replaced with its approximated gate that is chosen from the probability distribution obtained from only the positive terms in the decomposition, and for each circuit run or simulation, the measurement result is stored in memory (e.g., in an array or other data structure) and then the quantum computing device evaluates the average after all the circuit runs, and the average can be output as the expectation value.

In this way, quantum computing device can more quickly and reliably determine the expectation value in constant runtime while still having an acceptable amount of bias.

As shown in Table 1 below, experimental results were generated for comparing probabilistic error cancellation (PEC) as a comparative example and the error mitigation by restricted evolution (EMRE) method according to the embodiment.

For example, the below results were obtained using probabilistic error cancellation (PEC) with 1,000 and 10,000 samplings, and EMRE with 1,000 samples on the same SWAP-test circuit. The SWAP-test circuit used has 7 qubits and 140 gates, and it compared the GHZ-state with the $|000\rangle$ state.

TABLE 1

Comparison of error obtained by using EMRE with 1000 samples, PEC with 1000 samples, and PEC with 10000 samples on C-SWAP circuit with different depolarizing noise probabilities.

| Noise | EM (samples) | | | |
|---|---|---|---|---|
| probability | No EM | PEC(1000) | PEC(10000) | EMRE(1000) |
| 0.01 | 0.3633 | 0.3636 | 0.2641 | 0.4816 |
| 0.005 | 0.2382 | 0.2160 | 0.2441 | 0.1937 |
| 0.001 | 0.0879 | 0.0665 | 0.0681 | 0.0333 |
| 0.0005 | 0.0488 | 0.0214 | 0.0293 | 0.0170 |

It was found that the bias associated with the error mitigation by restricted evolution (EMRE) method of the embodiment is comparable (e.g., especially for low noise probabilities) to the bias from using probabilistic error cancellation (PEC) in many situations, and as shown in Table 1, the EMRE method achieves better bias with a much smaller sample size as the noise probability decreases.

Further, the actual sample size for the EMRE method can be about 1,100 samples irrespective of the noise probability and the circuit size. However, in contrast to the EMRE method, for the PEC, the sample size required to get an unbiased estimate of the expectation value increases with increasing noise probability and circuit size. For instance, with 0.001 (0.005) depolarizing noise probability, the sampling overhead required for PEC is estimated to be in the order of $10^4$ ($10^5$), which is not practical and would destroy any quantum advantage. Thus, the error mitigation by restricted evolution (EMRE) method of the embodiment provides considerable advantages.

According to an embodiment, the quantum computing device can use the generated average value to perform an action based on the estimate expectation value, e.g., calculating a ground state of a quantum system, which can used for a wide range of applications, such as quantum chemistry, material science, physics, cryptography etc. For instance, calculating the ground state for molecules can provide insights into their electronic structures, bond energies, and reaction mechanisms, can be used for drug discovery, and developing new materials.

According to one or more embodiments of the present disclosure, the quantum computing device can solve one or more technological problems in the existing technology, such as mitigating error in a quantum computer while reliably determining an expectation value of a physical observable. More specifically, instead of determining an expectation value with exponential runtime as in existing methods which can be intractable, according to an embodiment, the quantum computer implementing the EMRE method can determine the expectation value in constant runtime.

In addition, the quantum computing device can reliably determine an expectation value with error mitigation by restricted evolution that has a constant runtime and reduced overhead sampling, which can be used for various applications, such as factoring, solving linear systems, quantum simulations, decryption, cryptography and quantum chemistry/material discovery.

According to one or more embodiments, the quantum computing device can adequately mitigate error using an elegant solution that drastically reduces processing times and conserves computing resources while still producing reliable results.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for mitigating error in a quantum computing device, the method comprising:

receiving quantum circuit specification data defining a quantum circuit configuration, the quantum circuit configuration specifying a plurality of quantum gates;

obtaining a set of implementable quantum gates, each of the implementable quantum gates corresponding to a quantum operation capable of being executed by hardware of the quantum computing device;

generating a plurality of quasi-probabilistic decompositions for the plurality of quantum gates, respectively, based on the set of implementable quantum gates, each of the plurality of quasi-probabilistic decompositions including a positive component and a negative component;

generating an updated quantum circuit configuration by replacing each of the plurality of quantum gates in the quantum circuit configuration with at least one implementable quantum gate selected from among the set of implementable quantum gates, the at least one implementable quantum gate corresponding to the positive component of a corresponding quasi-probabilistic decomposition; and executing the updated quantum circuit configuration, by the quantum computing device, to generate an expectation value.

2. The method of claim 1, further comprising:

repeatedly executing, by the quantum computing device, the updated quantum circuit configuration for a predetermined number of runs to generate a plurality of expectations values;

storing the plurality of expectations values corresponding to the predetermined number of runs in a memory of the quantum computing device; and outputting an average expectation value corresponding to an average of the plurality of expectations values.

3. The method of claim 2, wherein the average expectation value is generated according to a constant runtime.

4. The method of claim 2, wherein the average expectation value expectation is of a Pauli observable O and has a bias b according to Equation:

$$|E_{\mathcal{B}} - Tr[O\mathcal{U}(|0\rangle\langle0|)]| \leq b$$

where $E_B$ is the average expectation value expectation subtracted from an actual ideal value given by a trace operation.

5. The method of claim 1, wherein each of the plurality of quasi-probabilistic decompositions is based on equation U=sB−(s−1)N, where U corresponds to a quantum gate in the quantum circuit configuration, B is a probabilistic combination of implementable quantum gates, N is a quantum channel, and s is a coefficient corresponding to a generalized robustness, and wherein the at least one implementable quantum gate selected from among the set of implementable quantum gates and included in the updated quantum circuit configuration includes sB and does not include −(s−1)N, wherein sB corresponds to the positive component and −(s−1)N corresponds to the negative component.

6. The method of claim 5, further comprising:

setting the probabilistic combination of implementable quantum gates (B) to be approximately equal to the quantum gate U by setting the quantum channel N that minimizes s−1.

7. The method of claim 5, wherein B is a probabilistic sum of at least two implementable operations including $p_a$A+ $p_b$B, where A is a first implementable gate, B is a second implementable gate, $p_a$ is a first probability, and $p_b$ is a second probability.

8. The method of claim 1, wherein the set of implementable quantum gates includes a Hadamard gate, a T gate, a T-dagger gate, and a controlled-NOT gate.

9. The method of claim 1, wherein the plurality of quasi-probabilistic decompositions are determined based on partially depolarizing noise.

10. The method of claim 1, wherein the executing the updated quantum circuit configuration by the quantum computing device has runtime t based on equation:

$$t = 2c^{-2}\log(2p_f^{-1}),$$

and wherein c is a constant and $p_f$ is a probability of failure.

11. A quantum computing device, comprising:

a memory configured to store measured expectation values; and a quantum processor including a plurality of qubits, and configured to:

receive quantum circuit specification data defining a quantum circuit configuration, the quantum circuit configuration specifying a plurality of quantum gates, obtain a set of implementable quantum gates, each of the implementable quantum gates corresponding to a quantum operation capable of being executed by hardware of the quantum computing device, generate a plurality of quasi-probabilistic decompositions for the plurality of quantum gates, respectively, based on the set of implementable quantum gates, each of the plurality of quasi-probabilistic decompositions including a positive component and a negative component, generate an updated quantum circuit configuration by replacing each of the plurality of quantum gates in the quantum circuit configuration with at least one implementable quantum gate selected from among a set of implementable quantum gates, the at least implementable quantum gate corresponding to the positive component of a corresponding quasi-probabilistic decomposition, and execute the updated quantum circuit configuration to generate an expectation value.

12. The quantum computing device of claim 11, wherein the quantum processor is further configured to:

repeatedly execute the updated quantum circuit configuration for a predetermined number of runs to generate a plurality of expectations values, store the plurality of expectations values corresponding to the predetermined number of runs in a memory of the quantum computing device, and output an average expectation value corresponding to an average of the plurality of expectations values.

13. The quantum computing device of claim 11, wherein the average expectation value is generated according to a constant runtime.

14. The quantum computing device of claim 12, wherein the average expectation value expectation is of a Pauli observable O and has a bias b according to Equation:

$$|E_{\mathcal{B}} - Tr[O\mathcal{U}(|0\rangle\langle0|)]| \leq b$$

where $E_B$ is the average expectation value expectation subtracted from an actual ideal value given by a trace operation.

15. The quantum computing device of claim 11, wherein each of the plurality of quasi-probabilistic decompositions is based on equation U=sB−(s−1)N, where U corresponds to a quantum gate in the quantum circuit configuration, B is a probabilistic combination of implementable quantum gates, N is a quantum channel, and s is a coefficient corresponding to a generalized robustness, and wherein the at least one implementable quantum gate selected from among the set of implementable quantum gates and included in the updated quantum circuit configuration includes sB and does not include −(s−1)N, wherein sB corresponds to the positive component and −(s−1)N corresponds to the negative component.

16. The quantum computing device of claim 15, wherein the quantum processor is further configured to:

set the probabilistic combination of implementable quantum gates (B) to be approximately equal to the quantum gate U by setting the quantum channel N that minimizes s−1.

17. The quantum computing device of claim 15, wherein B is a probabilistic sum of at least two implementable operations including $p_a$A+$p_b$B, where A is a first implementable gate, B is a second implementable gate, $p_a$ is a first probability, and $p_b$ is a second probability.

18. The quantum computing device of claim 11, wherein the set of implementable quantum gates includes a Hadamard gate, a T gate, a T-dagger gate, and a controlled-NOT gate.

19. The quantum computing device of claim 11, wherein the plurality of quasi-probabilistic decompositions are determined based on partially depolarizing noise.

20. The quantum computing device of claim 11, wherein the quantum processor executes the updated quantum circuit configuration according to runtime t based on equation:

$$t = 2c^{-2}\log\left(2p_f^{-1}\right),$$

and wherein c is a constant and $p_f$ is a probability of failure.

\*   \*   \*   \*   \*